_United States Patent_ [19]

Wellach

[11] Patent Number: 5,054,974
[45] Date of Patent: Oct. 8, 1991

[54] TOOL HOLDING DEVICE

[76] Inventor: Adolf Wellach, 8, Ilexweg, D-4630 Bochum 7, Fed. Rep. of Germany

[21] Appl. No.: 400,576

[22] Filed: Aug. 30, 1989

[30] Foreign Application Priority Data

Sep. 2, 1988 [DE] Fed. Rep. of Germany ....... 3829800

[51] Int. Cl.[5] ............................................. B23B 31/00
[52] U.S. Cl. ................................. 408/239 A; 10/89 F; 408/714; 408/141; 279/1 Q; 279/18
[58] Field of Search ........ 408/127, 714, 238, 117–119, 408/239 R; 10/89 F, 141 H; 279/1 Q, 16–18, 6, 1 L; 267/170, 140, 141, 153; 82/110, 158

[56] References Cited

U.S. PATENT DOCUMENTS

| Re. 25,737 | 3/1965 | Brainard et al. | 29/709 X |
| 1,836,471 | 12/1931 | Knight et al. | 279/16 |
| 2,042,648 | 6/1936 | Ziegler | 279/16 |
| 2,535,338 | 12/1950 | Wilcox | 279/16 |
| 2,547,518 | 4/1951 | Benjamin et al. | 279/16 |
| 3,072,417 | 1/1963 | Ziegler | 279/16 |
| 3,077,352 | 2/1963 | Van Straaten | 279/16 |
| 3,101,934 | 8/1963 | Foundstone | 279/16 |
| 3,158,391 | 11/1964 | Carmi et al. | 279/16 |
| 3,174,168 | 3/1965 | Jones | 406/238 X |
| 3,214,773 | 11/1965 | Benjamin et al. | 408/714 X |
| 3,677,535 | 7/1972 | Beck | 267/153 X |
| 4,781,365 | 11/1988 | Harrison | 267/153 X |

FOREIGN PATENT DOCUMENTS

| 869991 | 10/1981 | U.S.S.R. | 279/16 |
| 1351163 | 4/1974 | United Kingdom | 408/127 |

Primary Examiner—Larry I. Schwartz
Assistant Examiner—Robert Schultz
Attorney, Agent, or Firm—Blakely, Sokoloff, Taylor & Zafman

[57] ABSTRACT

The tool holder, which serves principally for receiving a thread cutting tool, has a length compensation under tension and compression. This purpose is served by two compression springs which comprise massive elements of foamed, open and closed cell polyurethane elastomer. This material has good spring and damping properties. The compression springs operate without fatigue. The tool holder also has a coupling which permits radial movements of the thread cutting tool transverse to the axis of rotation in order to compensate for alignment errors.

18 Claims, 1 Drawing Sheet

U.S. Patent
Oct. 8, 1991
5,054,974
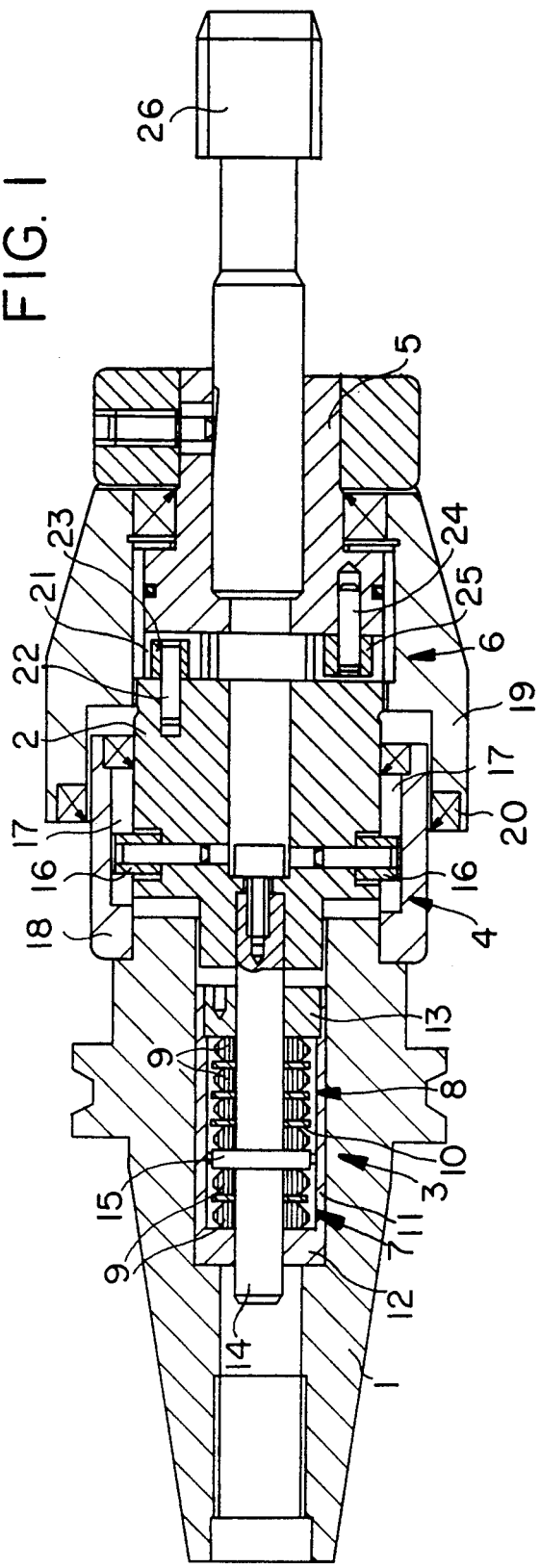
FIG. I
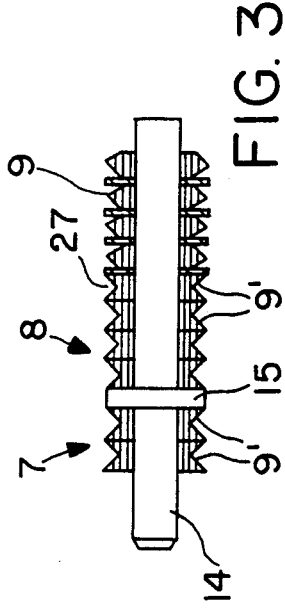
FIG. 2
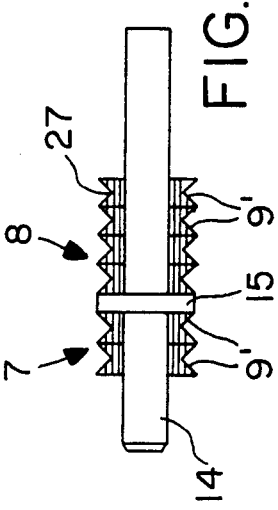
FIG. 3

TOOL HOLDING DEVICE

FIELD OF THE INVENTION

The invention relates to a tool holding device for machine tools, particularly for thread cutting machines.

BACKGROUND OF THE INVENTION

When thread cutting the tool is applied to the bore in the workpiece with a high feed force in order to achieve as immediate a commencement of cutting as possible. A resilient length compensation under compression prevents impermissible shock loads. Later in the thread cutting process a feed is used which is somewhat smaller than the pitch of the thread. The difference is compensated for by a resilient length compensation under tension. The latter is also effective if the tool runs on after the rotary drive and the feed have been switched off. A coupling which permits the tool holding fixture to perform radial movements transverse to the axis of rotation compensates for alignment errors between the tool and the bore.

It has been found in practice that the spring system, which compensates for differences in length of the holder and returns the axially movable portions of the holder into a neutral position, is subject to such high loads that it rapidly fatigues. This applies particularly to the length compensation under compression. In this case a fatigue of the spring device leads to the feed force, which is necessary for the beginning of cutting, building up ever later. An increasing proportion of the pre-programmed feed is thus used up before the tool penetrates into the bore. The consequence is that the depth of the thread does not achieve the necessary and pre-programmed dimension. In order to counteract this disadvantage a frequent readjustment of the programming is necessary to compensate for the spring fatigue.

THE INVENTION

It is the object of the invention to improve the tool holder in such a manner that a frequent readjustment of the programming necessitated by fatigue of the spring system is avoided.

The invention provides a tool holder for machine tools, particularly for thread cutting machines. The tool holder has a holding portion on the machine side and a holding portion on the tool side which are rotatably coupled together but can effect relative movement in the direction of the axis of rotation. A spring system attempts to hold the two holding portions in an axially neutral position. The spring system includes first spring means, which attempt to counteract an axial moving apart of the holding portion on the tool side from the holding portion on the machine side, and second spring means, which act as a compression spring and attempt to counteract a deflection by axial compression of the two holding portions. The invention provides that at least the second spring means, and preferably also the first spring means, are constructed as compression springs and comprise at least one, and preferably a plurality, of substantially massive elements of elastic plastics material. The first spring means, which attempt to return the two holding portions into the neutral position following a deflection as a consequence of moving apart is referred to below as "length compensation under tension" and the second spring means, which attempt to counteract a deflection as a consequence of the two holding portions being pressed together, is termed "length compensation under compression".

Surprisingly, it has been found that the fatigue of the spring device is caused less by comparatively long-amplitude alternating loads but instead predominantly by the short-amplitude but high frequency vibrations which occur during the cutting process. Conventional spring devices, which operate with coil springs of spring steel, are not capable of dealing with these vibrations in the long term. The invention makes use of the recognition that the damping of the vibrations is the crucial factor for fatigue-free operation of the spring device. Surprisingly, the preferably massive element of elastic plastics material combines very good spring properties with very good damping properties. Practice has shown that readjustment of the program is only necessary, if at all, after a very long service life. As a rule, rest periods caused by production factors occur beforehand which enable the element of plastics material, which may be cheaply manufactured as a mass produced article, to be replaced.

In principle, all plastics materials which combine the desired spring and damping properties can be used. Currently preferred is foamed, open and closed cell (mixed cell) polyurethane elastomer.

The compression spring enabling the length compensation under tension is preferably softer than the other compression spring since the former has to accommodate lower forces. A differing spring hardness can be set by the material choice and/or shape. If every compression spring comprises a packet of similar elements of plastics material, very widely varying combinations of spring hardnesses can be pre-selected on the basis of a single elastic starting element.

In a preferred embodiment the compression springs, but at least the compression spring enabling the length compensation under tension, are so constructed that they have a constant spring force substantially independent of the spring displacement. The mode of operation of the tool holder may thus be considerably improved.

In order to achieve the desired spring characteristic the compression springs can comprise elements of different Shore hardness. It is also possible that each compression spring comprises elements of differing shape. In this connection there are numerous possibilities for modification. Thus the outer shape of the elements can be different or merely their diameter. Furthermore, a compression spring can comprise elements with interposed spacer discs of differing thickness and/or differing diameter.

The tool holder in accordance with the invention is suitable, in particular, for thread cutting but can also be used with the same advantage for counterboring and milling since comparable working conditions are present in these processes.

BRIEF DESCRIPTION OF THE INVENTION

FIG. 1 shows a longitudinal section through a tool holder in accordance with the invention;

FIG. 2 shows a detail from FIG. 1 of a modified embodiment.

FIG. 3 shows a detail from FIG. 1 of a modified embodiment.

DETAILED DESCRIPTION OF THE PREFERRED EMBODIMENT

As shown in FIG. 1, the tool holder includes a holding portion 1 on the machine side and a holding portion 2 on the tool side. Arranged between the two holding portions 1 and 2 is a spring system 3 which is responsible for length compensation under tension and compression. Furthermore, the holding portions 1 and 2 are rotationally coupled so as to be longitudinally movable by means of a carrier device 4. Arranged between the holding portion 2 on the tool side and a tool receiving sleeve 5 is a coupling 6 which permits radial movements of the tool receiving sleeve 5 transverse to the axis of rotation.

The spring system 3 includes a compression spring 7 for the length compensation under compression and a compression spring 8 for the length compensation under tension. Both compression springs comprise a packet of elements 9 of foamed, mixed cell polyurethane elastomer. This material has good spring properties and simultaneously good damping properties. The spring system 3 therefore has no tendency to fatigue.

The compression spring 7 comprises two elements 9 whilst the compression spring 8 includes four elements 9. The latter is correspondingly softer.

The elements 9 are constructed as lens-shaped rings. In order to avoid relative displacements, a respective spacer disc 10 is arranged between the individual lens-shaped rings 9. The number of elastic elements used for both springs can be selected at will in accordance with the application and construction.

The two compression springs 7 and 8 are surrounded by a housing 11 which is secured by adhesive in the holding portion 1 on the machine side and whose base 12 and screwed-on lid 13 form axial abutments for the two compression springs. The elastic rings 9 are pushed onto a rod 14 which is screwed to the holding portion 2 on the tool side and extends through the housing 11. Fixedly arranged on the rod 14 is a disc-shaped actuator 15 for the two compression springs 7 and 8. The constructional unit comprising the rod 14 and compression springs 7,8 may be easily replaced.

The carrier device 4 has rollers 16 which are perpendicular to the axis and are mounted in the holding portion on the workpiece side and engage in axial guides 17. The guides 17 are defined by a sleeve 18 which is secured by adhesive to the holding portion 1 on the machine side. A collar 19 engages over the sleeve 18 with the interposition of an oil sealing ring 20. The collar 19 is screwed to the holding portion 2 on the tool side.

The coupling 6 has a coupling disc 21 which is in sliding surface contact not only with the holding portion 2 on the tool side but also with the tool receiving sleeve 5. It is provided with four radial slots which are angularly spaced from one another by 90°. Pegs 22 on the holding portion 2 on the tool side engage in a pair of opposing slots with the interposition of rollers 23, see the upper portion of FIG. 1. Pegs 24 on the tool receiving sleeve 5 engage in the other pair of opposing slots, again with the interposition of rollers 25. This is shown in the lower portion of FIG. 1. In this connection, the lower portion of FIG. 1 is on a sectional plane which is offset by 90° from the plane of the drawing. The coupling disc 21, which comprises plastics material, may be highly loaded and is easily movable with respect to the holding portion 2 on the tool side and the tool receiving sleeve 5. It permits the desired radial movements of the latter for the purpose of compensating for an axial offset.

The illustrated tool is a thread cutting tool 26. The tool holder in accordance with the invention may however be used with the same advantage in countersinking and milling and also in boring and reaming fixtures.

FIG. 2 shows the rod 24 with the compression springs 7 and 8 and the disc-shaped acutator 15 between them. However, in this case the compression springs 7 and 8 do not comprise lens-shaped elements 9 but elements 9' with plane parallel sides. The interposition of spacer discs 10 can be omitted. To improve the spring characteristic each element 9' is provided with a circular peripheral notch 27. The elements 9' have a circular periphery, as do the elements 9.

Modifications are possible within the scope of the invention. Thus the elements 9 and 9' can without difficulty have, for instance, a polygonal periphery. The same applies to the spacer discs 10, whereby their thickness can also differ. System 3 can also be reversed in such a way that the actuator 15 is secured to the holding portion 1 on the machine side and that the housing 11 is arranged in the holding portion 2 on the tool side. Furthermore, with an appropriate different arrangement of the abutments for the two compression springs 7 and 8 the housing 11 can be omitted. The coupling 6 can be provided at any desired position on the tool holder, that is to say even in the holding portion 1 on the machine side. Additionally, a lubricant reservoir can be provided for the coupling 6.

I claim:

1. A tool handling device for machine tools having a machine side and a tool side including:
    a holding element on the machine side, rotatably mounted about an axis of rotation;
    a holding element on the tool side, a tool receiver;
    carrier means or rotationally coupling said two holding elements for rotary movement about the axis of rotation, said carrier means permitting relative movements of the two holding elements in the direction of the axis of rotation;
    coupling means for transmitting torque between the tool receiver and said holding element on the tool side, said coupling means being connected to the tool receiver in such a manner that movements of the tool receiver radially of the axis of rotation with respect to said holding element on the tool side are permitted;
    a spring system for maintaining a neutral position of the two holding elements relative to the one another and having
    first spring means to counteract such a deflection in which the two holding elements are moved axially apart; and
    second spring means acting as a compression spring to counteract such a deflection in which the two holding elements are moved axially together, said second spring means acting as a compression spring comprising at least one substantially massive element of elastic plastics material.

2. Tool holder as claimed in claim 1 wherein said first spring means are constructed as a compression spring and include at least one substantially massive element of elastic plastics material.

3. Tool holder as claimed in claim 2 wherein the biasing force of the first spring means is less than that of the second spring means.

4. Tool holder as claimed in claim 3 wherein the first and second spring means are each constructed from a packet of plastics elements which are arranged in a row such that together they determine the spring force of the respective spring means.

5. Tool holder as claimed in claim 4 wherein the first spring means has a larger number of plastics elements than the second spring means.

6. Tool holder as claimed in claim 2 wherein the elastic elements of the first and second spring means comprise foamed, mixed cell polyurethane elastomer.

7. Tool holder as claimed in claim 2 wherein each said at least one substantially massive element of elastic plastics material are constructed as rings with a substantially biconvex lens-shaped axial cross-section.

8. Tool holder as claimed in claim 2 wherein the plastics elements are constructed as annular discs with substantially plane parallel side walls.

9. Tool holder as claimed in claim 8 wherein the plastics elements have a peripheral groove.

10. Tool holder as claimed in claim 2 wherein at least one of the first and second spring means is constructed from plastics elements of different Shore hardness.

11. Tool holder as claimed in claim 2 wherein at least one of the first and second spring means is constructed from a plurality of plastics elements of different shape.

12. Tool holder as claimed in claim 2 wherein the first and second spring means are each constructed from alternating elastic plastics elements and spacer discs.

13. In a tool holder for machine tools including a holding portion on the machine side, rotatably mounted about an axis of rotation, a holding portion on the tool side, rotatably mounted about the axis of rotation, means for rotationally coupling the two holding portions for rotational movement about the axis of rotation, said coupling means permitting relative movement of the two holding portions in the direction of the axis of rotation, a spring system for maintaining an axial neutral position of the two holding portions relative to one another, said spring system having:
    first spring means acting as a compression spring and attempting to return the holding portion on the tool side into the neutral position after the two holding portions have moved apart axially, said first spring means comprising at least one substantially massive element of elastic plastics material; and
    second spring means acting as a compression spring and attempting to return the holding portion on the tool side into the neutral position after the two holding portions have been axially pressed together, said second spring means comprising at least one substantially massive element of elastic plastics material.

14. Spring system as claimed in claim 13 wherein the first and second spring means are each constructed from a packet of plastics elements which are arranged in a row such that they together determine the spring force of the respective spring means.

15. Spring system as claimed in claim 14 wherein the first spring means has a larger number of plastics elements than the second spring means.

16. A tool holder for machine tools, including a holding portion on the machine side, rotatably mounted about an axis of rotation;
    a holding portion on the tool side,
    means for rotationally coupling the two holding portions for rotation about the axis of rotation, said coupling means permitting relative movement of the two holding portions in the direction of the axis of rotation;
    a spring system for maintaining an axial neutral position of the two holding potions relative to one another, said spring system having:
    first compression spring means including a packet with a plurality of elastic plastics elements, said first compression spring means being arranged between a first axial abutment and a first axial side of an actuator; and
    second compression spring means including a packet of elastic plastics elements, said second compression spring means being arranged between a second axial abutment and a second axial side of the said actuator opposed to the first axial side, wherein the first axial abutment and the second axial side of the said actuator are opposed to the first axial side, wherein the first axial abutment, the first compression spring means, the actuator, the second compression spring means and the second axial abutment are arranged axially behind one another and wherein the first and second abutment is connected to one of the holding portions on the machine and tool sides and the actuator is connected to the other of the two holding portions.

17. Tool holder as claimed in claim 16 wherein the actuator is fastened on a rod which passes through the two axial abutments and wherein the elastic plastics elements are rings which are pushed onto said rod on both sides of the actuator.

18. Tool holder as claimed in claim 17 further including a tubular housing defining a chamber for receiving the plastics elements, said housing being secured by adhesive in the one holding portion and having a base and a lid releasably connected to the housing, said base and lid portions forming the abutments for the first and second compression spring means.

* * * * *